United States Patent

Salaman et al.

[15] 3,674,922

[45] July 4, 1972

[54] SYNCHRONIZED OR UNSYNCHRONIZED PARTIAL RESPONSE BINARY SIGNALLING

[72] Inventors: Roy G. Salaman; John B. Picchiottino, both of Boulder, Colo.

[73] Assignee: Phonocopy, Inc., Wilmington, Del.

[22] Filed: Jan. 19, 1971

[21] Appl. No.: 107,866

Related U.S. Application Data

[63] Continuation of Ser. No. 719,062, April 5, 1968, abandoned, which is a continuation-in-part of Ser. No. 579,591, Sept. 15, 1966, abandoned.

[52] U.S. Cl. ....................................178/6, 178/66, 178/68, 178/88, 178/DIG. 3, 325/326

[51] Int. Cl. ....................H04b 1/66, H04b 3/14, H04l 27/00

[58] Field of Search ..........................178/66, 68, 69, DIG. 3; 179/15.55 R; 325/326

[56] References Cited

UNITED STATES PATENTS 3,094,667 6/1963 Brown ..................................325/326
3,109,069 10/1963 Kroll ....................................325/326
3,230,310 1/1966 Brogle ...................................178/68
3,347,981 10/1967 Kagan ....................................178/5
3,372,234 3/1968 Bowsher .................................178/66
3,478,350 11/1969 Gorog ....................................178/66
3,509,279 4/1970 Martin ...................................178/88

*Primary Examiner*—Howard W. Britton
*Attorney*—Chittick, Pfund, Birch, Samuels & Gauthier

[57] ABSTRACT

A transmission system for synchronized or unsynchronized non-return to zero (NRZ) binary waves with minimum time between transitions of $1/Kf_1$ where $K<2$ and $f_1$ is the upper frequency zero response for the transmission channel utilizes a center threshold to recover the original binary NRZ stream from a partial response binary signal resulting from transmission of the NRZ binary through the narrow band channel. The partial response binary signal transmitted is obtained from the original NRZ binary signal of signal shaping in accordance with an amplitude function of:

$A(f)=\frac{\pi f}{2f_1}\cot\frac{\pi f}{2f_1}$ and a linear phase characteristic.

15 Claims, 9 Drawing Figures

Inventors:
Roy G. Salaman – John B. Picchiottino,
by Russell, Chittick & Pfund
Attorneys Inventors:
Roy G. Salaman,
John B. Picchiottino,
by Russell, Chittick & Pfund Attorneys Inventors:
Roy G. Salaman,
John B. Picchiottino,
by Russell, Chittick & Pfund
Attorneys

SYNCHRONIZED OR UNSYNCHRONIZED PARTIAL RESPONSE BINARY SIGNALLING

CROSS REFERENCE TO RELATED APPLICATION

This application is a continuation of application Ser. No. 719,062 filed Apr. 5, 1968 and now abandoned, which is a continuation in part of Salaman and Picchiottino application entitled Binary Facsimile System U.S. Ser. No. 579,591, filed Sept. 15, 1966, now abandoned, for continuation application Ser. No. 64,096 filed July 28, 1970 which is now U.S. Pat. No. 3,624,282.

This previous application describes a facsimile transmission system employing clocked binary signals with biternary coding and decoding at the input and output ends of the transmission channel respectively. The system thus described makes maximum use of the available bandwidth for the transmission of pictorial information and is relatively noise-immune due to the synchronized nature of the decoding process. This optimum performance is achieved at the expense of relatively complex synchronized equipment at both the sending and receiving station.

FIELD OF THE INVENTION

This invention relates generally to signalling with partial response binary waves representing data pulses having a pulse width and bit rate which bear known relation to the bandwidth of the channel used for signalling and in which certain relationships are established among these quantities to permit efficient utilization of the transmission channel with synchronized or unsynchronized signals and simplified equipment.

DESCRIPTION OF THE PRIOR ART

Systems employing partial response transmission generally employ clocked signals which are decoded at the receiving terminal either by full wave rectification (Ringelhaan U. S. Pat. No. 3,162,724) or multilevel threshold logic (Lender U. S. Pat. No. 3,238,299). On the other hand systems which attempt to increase the data rate without resorting to partial response techniques must be satisfied with relatively modest data rates (Myrick U. S. Pat. No. 3,062,913). In both such prior art systems, the clocking requires additional relatively complex and costly apparatus as well as resulting in the phenomenon known as quantizing noise.

One of the disadvantages noticeable in the Salaman and Picchiottino patent application previously referenced when used for transmission of pictorial information is the quantizing noise. Since clocking of the original data signal reorients the black-white transitions which occur in a scan line to occur in coincidence with the clocked signal, the actual information transnitted does not correspond exactly with the black-white transitions which occur to the photocell as it traverses the scan line. Since the clocked system is capable only of reproducing black-white transitions in synchronism with clock time, the error introduced may approximate one bit interval and the resulting printout may show a significant degradation due to quantizing noise.

SUMMARY OF THE INVENTION

The present invention provides synchronous or asynchronous transmission systems of high data rate. When used for facsimile-type data transmitted asynchronously over the ordinary telephone line the invention has been found to provide improved results at the printout relative to the quantizing noise of the aforementioned application even though the present invention using asynchronous transmission is theoretically more subject to the ordinary electronic noise in such a transmission medium than a clocked system would be.

The principal object of the present invention is, accordingly, to provide an improved method and apparatus for synchronous or asynchronous binary digital data transmission over limited band channels. The asynchronous system utilizes greatly simplified apparatus and results, when used for facsimile, in facsimile copy that is in some respects an improvement relative to that heretofore achieved with more complex clocked transmission systems. In the drawings:

FIGS. 1(a) and 1(b) are amplitude-time diagrams useful in describing bi-ternary signalling theory;

FIGS. 2(a) and 2(b) show partial response signals at the maximum bit rate for the prior art and the present invention respectively;

Figures 1A, 1B, 2A, 2B, 3, 4:
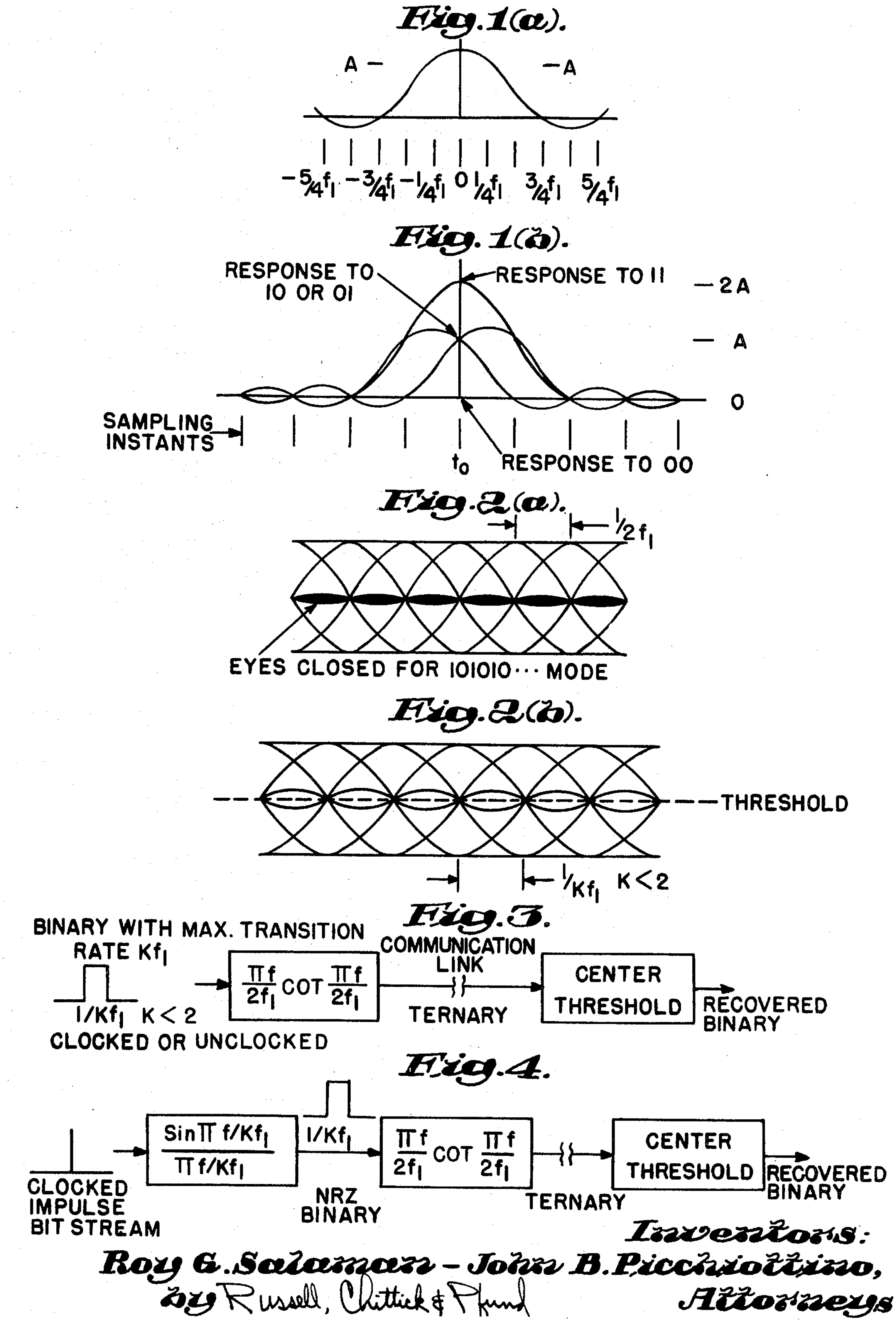
FIG. 3 is a block diagram of a synchronous or asynchronous non-return to zero binary wave transmission system according to the present invention.
FIG. 4 is a block diagram similar to FIG. 3 but only for clocked binary impulse signals.

Referring now to the drawings, a review of partial response digital transmission theory will be presented in order to establish the criteria which are pertinent to the present invention.

Bi-ternary signalling theory may be most easily described in terms of the "partial-response" transmission concepts set forth by E. R. Kretzmer in his paper, "Binary Data Communication by Partial Response Transmission," paper G–IE.5 on pp. 451–456 of the *First IEEE Annual Communications Convention Conference Record*, June 7–9, 1965. As there summarized: "A partial-response system transmits a two-level signal over a channel with memory extending over $n$ binary input symbols, and retrieves the binary sequence on the basis of L significant detected levels, where $L<n$." In the case of bi-ternary, $n=2$ and $L=3$. The key to retrieving the original bit stream is in the selection of the response of the channel to one binary signalling element in order to allow controlled memory. It has been shown that a channel with transmittance amplitude function $$Y(\omega)=\cos\frac{\pi\omega}{2\omega_1} \qquad 0\leqslant\omega\leqslant\omega_1$$

$$Y(\omega)=0 \qquad \omega>\omega_1 \text{ where } \omega=2\pi f$$

and a linear phase-frequency characteristic will have an impulse response, as measured with time as $t=0$ at the peak of the response, which with two exceptions goes through zero at odd positive or negative multiples of $1/4f_1$. The exceptions occur at $t=\pm 1/4f_1$ as shown in FIG. 1(a).

If this response is used as the signalling element for binary ones in a synchronous random bit stream at a rate of $2f_1$ bits per second and the resulting signal is measured only at the odd multiples of $1/4f_1$, the amplitudes measured will take on only three possible values; zero, A, and 2A depending upon whether the two responses adjacent to the measuring point were due to two binary zeros, a one and a zero (or vice versa) or two ones as shown in FIG. 1(b). Examination of superpositions of various combinations of 1's and 0's will lead one to the rule that in order to recover the original binary bit stream one must decode a bit as a "one" if the response is 2A at sample time, a "zero" if the response is 0 and the complement of the previously decoded bit if the response is A. Thus by allowing controlled memory, i. e., controlled intersymbol interference, one may transmit data at a higher rate in a specially shaped channel than could ordinarily have been done using conventional, memoryless binary transmission.

The foregoing theory has been described in terms of a clocked impulse signal input with $Y(f)=\cos \pi f/2f_1$ channel filtering and recovery of the original binary bit stream by sampling the received ternary signal and determining which of the three states the ternary signal is in at sample time. This is usually accomplished by means of two threshold levels being set and the ternary signal being interpreted as above the upper threshold, below the lower threshold or between the two thresholds.

If one wished to signal with pulses of width $1/2f_1$, resulting in a so-called non-return to zero (NRZ) signal, the channel shape previously specified would not be optimum. In accordance with the present invention signalling is accomplished without logic decoding and for NRZ pulses with or without clocking while channel shaping is selected that permits signalling rates which are only slightly less than those achieved with the more complex clocked bi-ternary systems of the prior art.

Consider first the spectrum of an impulse and the transformation of an impulse bit stream into a NRZ signal of pulses of width $1/2f_1$. Since the spectrum of an impulse is flat we need only multiply the NRZ signal by a spectral shape which is the reciprocal of the spectral shape of pulse of width $1/2f_1$. The spectrum of a pulse of width $1/2f_1$ is:

$$\left[\sin\frac{\pi f}{2f_1}\Big/\frac{\pi f}{2f_1}\right]$$

Hence if we use an NRZ signal as an input, our channel shape would be:

$$A(f)=\left[\left(\frac{\pi f}{2f_1}\right)\Big/\sin\frac{\pi f}{2f_1}\right]\cos\frac{\pi f}{2f_1}$$

$$A(f)=\frac{\pi f}{2f_1}\cot\frac{\pi f}{2f_1}$$

With cotangent channel shaping as specified by A(f), a clocked NRZ binary signal at bit rate $2f_1$ can be recovered by the usual sampling thresholds and logic to interpret the result in accordance with the controlled intersymbol interference.

The original binary data stream may be recovered from the ternary signal without sampling and with a single threshold by controlling the system to operate at a slightly lower transmission bit rate. This may be demonstrated by examination of the "eye pattern" (the oscilloscope display of the ternary wave received) resulting from a random synchronized NRZ bit stream driving $$A(f)=\frac{\pi f}{2f_1}\cot\frac{\pi f}{2f_1}.$$

For a bit rate of $2f_1$, the eye pattern is as shown in FIG. 2(a). The continuous horizontal line in the center of the pattern corresponds to the response to a binary sequence of 101010. The fundamental frequency of this sequence is $f_1$ cps and the function $A(f)=0$ at $f=f_1$. If the bit rate is reduced, however, so that the fundamental frequency of the 101010 sequence is less than $f_1$, small "eyes" will begin to open in the eye pattern as shown in FIG. 2(b). The step response rise time remains the same but the dwell time between transitions is lengthened. The amount the eyes must open in order to permit threshold detection centered on the wave will depend on the signal to noise ratio and the acceptable error rate. Some value of bit rate less than $2f_1$ will be usable in a channel of given signal-to-noise ratio which can be defined as a bit rate $Kf_1$ with $K<2$ where K approaches 2 for a noise-free channel. For such a system, if a slicing threshold is set, as indicated in FIG. 2(b), through the center of the small eyes the original binary sequence may be recovered.

The reduced bit rate required to achieve this result may be established to be compatible with the noise level by choosing a operable percentage small eye opening and finding at which frequency this occurs with respect to $f_1$ and then doubling it to find the bit rate. For average grade toll voice circuits an eye opening of 20 percent of peak response has been found to be satisfactory. Therefore let:

$$A(f_x)=\frac{\pi f_x}{2f_1}\cot\frac{\pi f_x}{2f_1}=0.2\text{ (approximately)}$$

solving for $f_x$ we find, for $f_x/f_1=0.91$ $A(f_x) = 1.43\cot 1.43$ $= 1.43\,(0.142)=0.203$ Therefore, at $f=f_x=0.91f_1$ we have a 20 percent eye opening and may transmit at a bit rate of 34 1.82f$_1$ bits per second and recover the original bit stream with a single slicing threshold.

The channel shaping for the NRZ signal at the reduced bit rate, i. e., $1.82f_1$ bits per second, remains the same as for the closed eye bit rate, i. e., $$A(f)=\frac{\pi f}{2f_1}\cot\frac{\pi f}{2f_1}.$$

A system of this type is shown in FIG. 3 with the communication link between the filter and the center threshold slicer indicated. What we have done is in effect to signal with wider pulses, the width being $1/1.8f_1$ seconds instead of $1/2f_1$ seconds. If one wished to signal with impulses, the channel shape would have to be modified to convert the impulses into pulses of width $1/1.82f_1$. This may be accomplished by simply multiplying the spectrum of an impulse (flat) by the factor $$\left(\sin\frac{\pi f}{1.82f_1}\Big/\frac{\pi f}{1.82f_1}\right)$$

to convert it to a pulse of width $1/1.82f_1$ as indicated in FIG. 4.

Of the systems shown in FIGS. 3 and 4 only the system of FIG. 3 (NRZ signals) can operate with non-synchronous data. This is true since in the non-synchronous NRZ case transitions can occur anywhere whereas if impulses were used the $$\sin\frac{\pi f}{Kf_1}\Big/\frac{\pi f}{Kf_1}$$

shaping would always predetermine where the transitions in the data would be.

Figure 5:
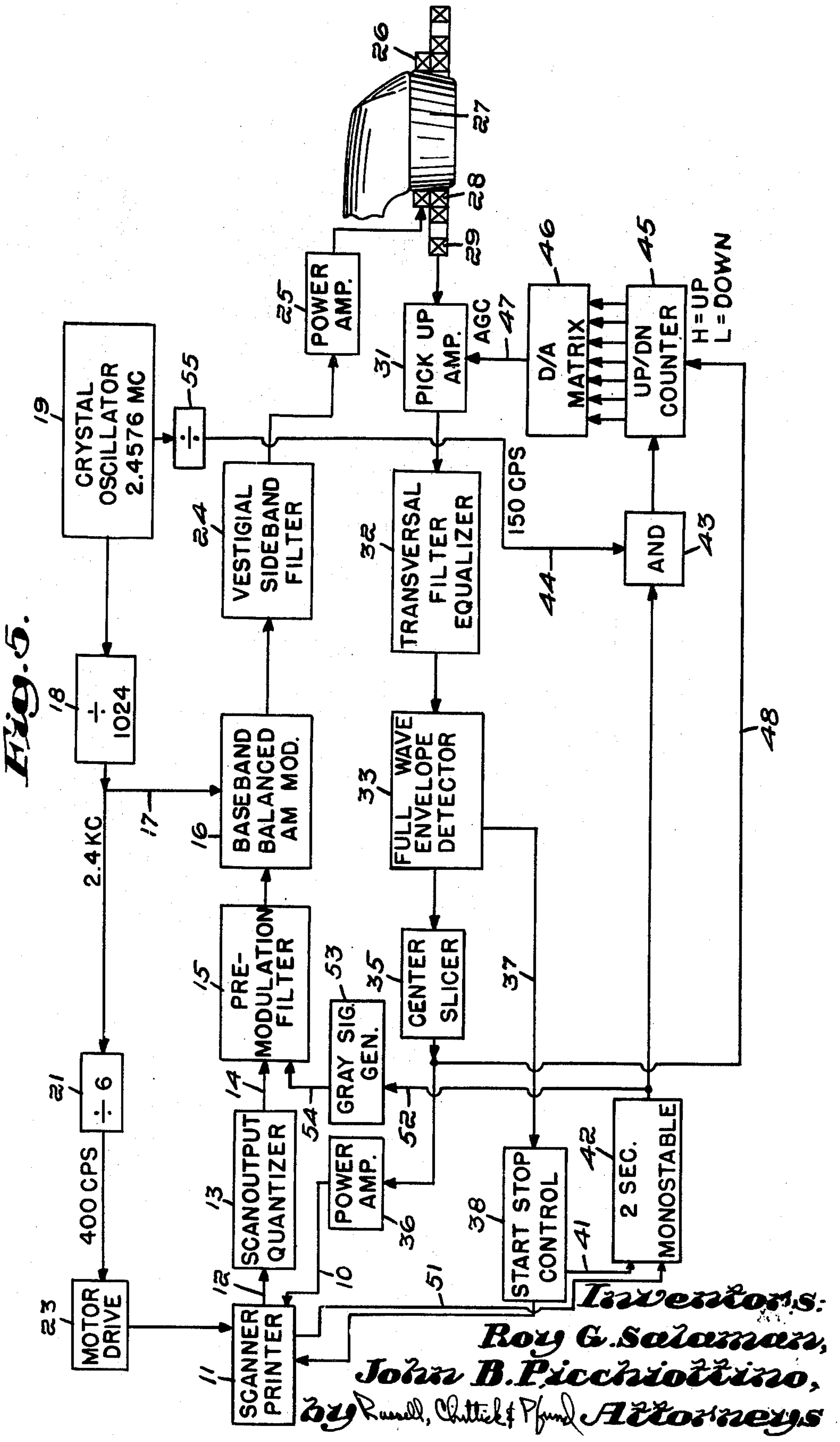
FIG. 5 is a block diagram of a facsimile system embodying the invention.

Referring now to FIG. 5, the invention will be described as incorporated in a telephone facsimile system of the type described in U. S. Pat. applications of Salaman et al., Ser. No. 579,584, now U.S. Pat. No. 3,502,814, and Ser. No. 579,591, both filed Sept. 15, 1966 and U.S. Pat. No. 3,624,282, reference to which is made and herein incorporated for the general details of such systems.

A scanner-printer 11 operates in transmit mode to scan the information on a document to be transmitted and convert it into an analog signal on line 12 representing black or white information. The signal on line 12 is preferably derived from a photocell and an illumination source which scans the copy to be transmitted line by line to produce the analog facsimile signal. The scanner-printer 11 also operates in response to signals on line 10 to print black on white signals when the unit is in receive mode with the scanner operating in synchronism with the remote transmitter scanner to reconstruct a facsimile copy of the original document.

Figures 6, 7:
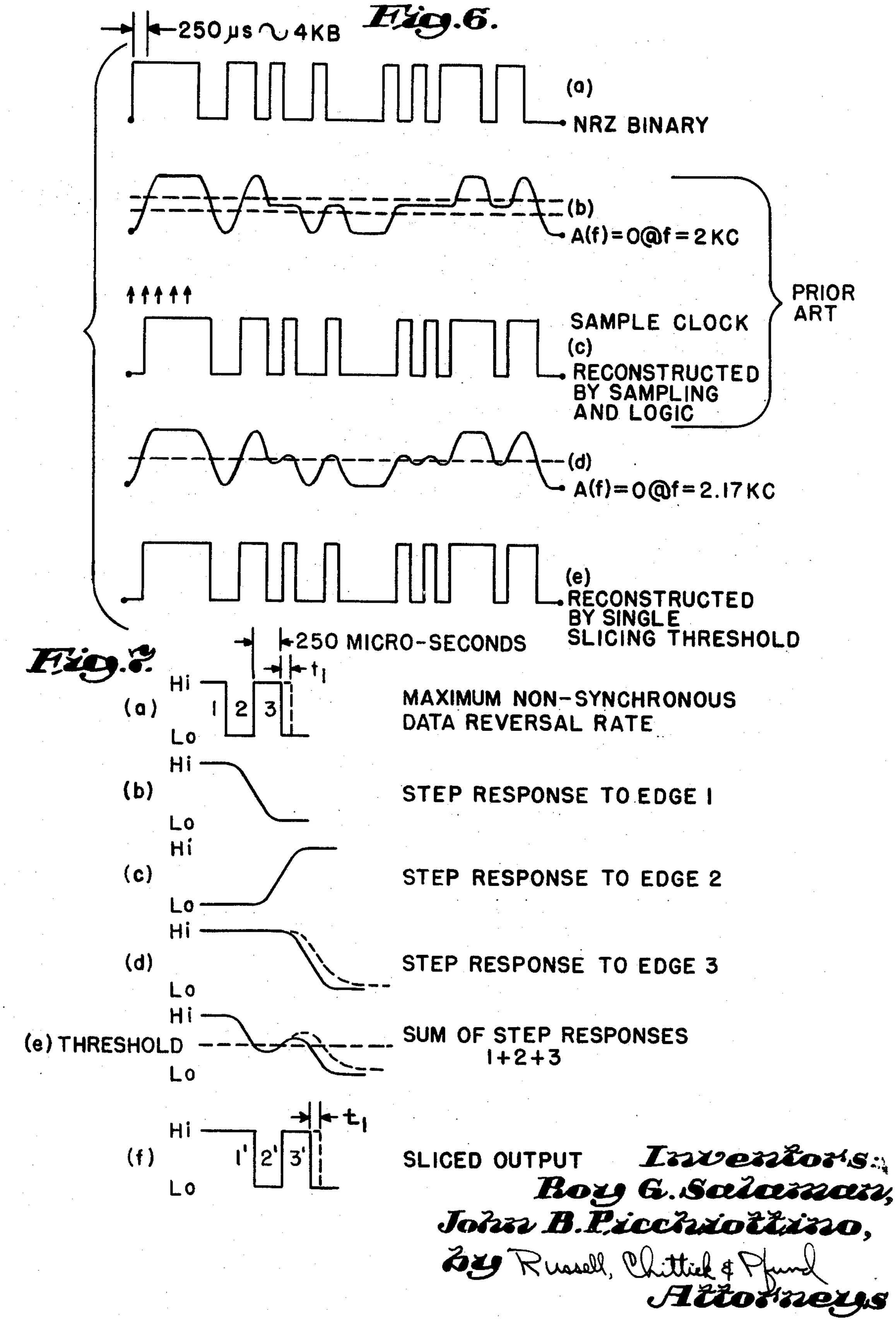
FIG. 6 is a waveform diagram for comparing the prior art and the invention.
FIG. 7 is a filter amplitude response diagram of a center-threshold slicer representing modifications of the invention.

The photocell signal on line 12 is two level quantized in unit 13 to provide on line 14 a binary non-return to zero (NRZ) type signal as indicated at waveform (a) in FIG. 6. This quantization is obtained by establishing a threshold for the analog signal on line 12 to select signals which are considered derived from white and black areas respectively of the document scanned by the photocell.

The information rate for the system is dictated by the bandwidth of the telephone line with which it is to be used and the scanning speed for the scanner-printer 11 is established to correspond thereto. As an example, the optical system in the scanner is designed to resolve an area 0.01 inches in diameter and the scan lines are spaced by 0.01 inch. The upper limit of the bit rate is 4,000 bits per second and the corresponding linear scanning speed is 40 inches per second. With a scanning system of this type, the desired resolution is achieved with a bit rate that does not exceed the capabilities of the system and thus optimum performance both as to resolution and speed of transmission is obtained to make maximum use of the bandwidth capabilities of the telephone line.

The NRZ signal on line 14 is passed through a premodulation filter 15 which has the response characteristic $A(f) = 0.725f\cot 0.725f$. This filter also has a linear-phase versus frequency characteristic over the range from zero to 2,170 cps. The quantity 0.725 is the value of $\pi/2f_1$ with $f_1$ equal to 2.17 kilocycles per second. With $f_1$ having a value of 2.17 kc the bit rate of $1.82f_1$ will be approximately 4,000 bits per second.

The output of filter 15 is applied to a baseband balanced AM modulator 16 which receives a 2.4 kc carrier on line 17 from a divider 18 which operates to divide by 1,024 the frequency of a precision crystal oscillator 19 operating at 2.4576 mc.

The 2.4 kc from divider 18 is also applied through a divider 21 to produce 400 cps on line 22 for synchronously operating the motor drive 23. The motor drives for line and page scanning in the scanner-printer 11 are maintained in synchronism by virtue of the precision crystal oscillator 19 located at each unit. As described in the previously referenced applications an index start-up of the system assures that the read and write scans will operate from an initial position on the left hand margin of the page.

The output of the modulator 16 is applied to a vestigial side-band filter 14 which has skew symmetrical roll-off relative to the carrier frequency of 2.4 kc, with a relative amplitude response of 0.5 at the carrier frequency and zero response at 3.0 kc.

The signal from the filter 24 is applied through a power amplifier 25 to drive a coupling coil 26 which is magnetically coupled to the U1 earpiece 27 of the standard 500 series telephone handset of the Bell Telephone Company.

Reception of facsimile signals is accomplished with the same equipment as shown in FIG. 5 located at the receiving station. Telephone signals received from the telephone line are magnetically coupled from handset 27 at the receiving station by means of a coupling coil 28 which has associated therewith a folded hum bucking coil 29 described in the application of Picchiottino, Ser. No. 579,589, filed Sept. 15, 1966, now U.S. Pat. No. 3,491,216. The 2.4 kc modulated signal picked up from telephone handset 27 is applied to a pickup amplifier 31 which supplies a signal to a transversal filter equalizer 32. The equalizer 32 corrects the phoneline for flat amplitude and linear phase over the frequency range of approximately 230 cps to 3,000 cps and in addition performs amplitude and phase corrections for imperfect filtering in other parts of the system. Thus the transversal filter amplitude and phase characteristic effects equalization for the system filters and a compromise equalization for the majority of phone connections to permit the system to operate successfully with substantially all toll telephone interconnections in the telephone system.

The output of the filter 32 is applied to a full wave envelope detector 33. The detector 33 includes a low pass post-rectification filter and thus applies to a center slicer 35 the recovered partial response binary signal modulation waveform (d) in FIG. 6. The center slicer 35 operates relative to the center of the waveform (d) and produces an output waveform (e) which is binary as determined by whether the waveform (d) is above or below the center slicing threshold. This waveform (e) in FIG. 6 is applied to a power amplifier 36 which thus supplies the black and white signals on line 10 to operate the printer in scanner-printer 11.

The full wave envelope detector 33 upon the receipt of a carrier from the filter 32 produces on line 37 a signal representing the receipt of a message. This signal on line 37 is applied to a start-stop control 38 which starts the printer in scanner-printer 11 in synchronism with the scan at the transmitting station.

The start-stop control 38 also applies a signal which controls the gain of pickup amplifier 31 to establish the slicing threshold of center slicer 35 in the manner which will now be described. The reception of a signal on line 37 indicating detection in the detector 33 produces an output pulse on line 41 which sets a monostable circuit 42 which has a relatively long pulse period such as 2 seconds. For the duration of the 2-second pulse output of monostable 42, an AND gate 43 is enabled to pass 150 cps signals on line 44 to the input of an up-down counter 45. The 150 cps signal on line 44 may be derived from any convenient source such as indicated by divider 55 driven from oscillator 19.

The count in the counter 45 is converted into an analog voltage by a digital to analog matrix 46 and this voltage is applied on line 47 as the AGC potential for amplifier 31. The direction of the count in the counter 45 is controlled by the relative polarity of signal on line 48 which is obtained from the output of slicer 35.

When the transceiver of FIG. 5 is transmitting a message a document detector in scanner-printer 11 provides a transmit mode signal on line 51 which is applied to the monostable circuit 42 to slightly lengthen the duration of the output pulse generated. This slightly lengthened pulse period of the output of monostable 42 is applied on line 52 to a gray signal generator 53. The gray signal generator 53 applies on line 54 a signal to filter 15 which has an amplitude corresponding to the mid-point between the amplitudes of normal black and white NRZ signals received on line 14. This so-called gray level signal on line 54 is effective for a brief interval after a document has been inserted in the scanner-printer 11 but before any black signal is scanned to produce a signal on line 14.

With a modulation level of magnitude corresponding to the gray signal received by the envelope detector 33 and applied to the slicer 35, the relative polarity of the output of the slicer 35 will depend upon the gain of the amplifier 31, since if the modulation level is amplified above the slicer threshold an output polarity from slicer 35 will be obtained which is opposite that which would occur if the gain of amplifier 31 amplifies the gray signal modulation level to be less than the slicer threshold.

The high or low output of slicer 35 is applied on line 48 as degenerative feedback to make the counter 45 count up or down as required to change the gain of amplifier 31 to a value which makes the gray level modulation applied to slicer 35 correspond to the slicing threshold. This gain level of amplifier 31 is maintained throughout the transmission since at the end of the 2-second pulse from monostable 32 the AND 43 is disabled and the count in counter 45 is fixed until the next message sequence.

With the gain of amplifier 31 set, the signals corresponding to black and white are received and sliced relative to a voltage level mid-way between the black and white signals by the slicer 35 which thus slices at the proper point for recovering the original NRZ data signal.

Filter shapes other than the cotangent shape described above can be used to achieve similar results. The general characteristics of these filters may be derived from consideration of the step response of the filter for a particular case. Considering the facsimile system just described having a resolution of 100 lines per inch and a scan speed requiring a maximum transmission rate of 4,000 bits per second, the NRZ pulse will be no shorter than 250 $\mu$s. That is, the highest alternation rate from 1's to 0's is 4,000 transitions per second which corresponds to 100 lines per inch. The step response requirements are that the filter response to the 101010 mode should be 20 percent so that the highest data reversal rate can be recovered by slicing at the center. So one point on the generalized filter amplitude vs. frequency response is $A(f)=0.2$ at $f=2$KC.

Consider now the analysis of the filter to the 1010 mode by summing the step responses of the filter to each of the transition edges. The individual step responses to three successive transitions at the maximum rate shown in FIG. 7(a) are given in FIG. 7(b), (c) and (d). The sum of these responses is shown in FIG. 7(e) and the recovered signal obtained by center slicing is given in FIG. 7(f). The required step response for such performance is:

a. The step response must have negligible ringing or overshoot so that, for example, the step response due to edge 1 does not interfere with the proper time position of the threshold crossing of edge 3 step response. If ringing occurs on the flat portions of the response due to edge 1 it could interfere with the position of recovered edge 3'.

b. The step response must be complete in less than, or equal to, two bit periods or 500 micro-seconds in the example given. If the step response rise time were longer, threshold crossing errors again due to intersymbol interference could occur. If the step response rise time were shorter than 500 micro-seconds the response would be acceptable but the filter would have to have a wider bandwidth. The best compromise from bandwidth considerations, therefore, is to have the step response rise time equal to 500 micro-seconds or two bit periods.

Now consider edge 3 being displaced to the right in time by any amount $t_1$. Then the step response to edge 3 would also be displaced by the same amount. The slicer transition will occur a little later in time and give perfect recovery for the dwell time between edge 2 and edge 3 irrespective of its magnitude so long as it exceeds 250 micro-seconds. Thus edge 3 can occur anywhere and the filter is satisfactory for non-synchronous data.

Further inspection will show that as long as the minimum dwell time is 250 micro-seconds and we use a filter with the above step response requirements perfect recovery will result. If the dwell time goes below 250 micro-seconds, or if the step response is longer than 500 micro-seconds, or if ringing and overshoot are allowed; intersymbol interference will result and the recovery will not be perfect in accordance with the degree of the imperfections.

Various modifications and applications of the present invention will now be apparent to those skilled in the art using the features of the present invention the scope of which is defined by the appended claims.

We claim:

1. The method of transmitting data over a narrow band channel comprising the steps of:

deriving said data in the form of a binary non-return to zero (NRZ) wave having a maximum transition rate of $Kf_1$ where $f_1$ is the upper frequency zero response of the transmission channel and K has a value less than 2 but which approaches 2 for a noise-free channel;

filtering said binary NRZ wave with a linear phase-frequency characteristic, a smooth amplitude roll off which at frequency $Kf_1/2$ is less than 40 percent of mid-band response, and which completes its response to each transition with negligible overshoot in no longer time than $2/Kf_1$ to obtain a partial response binary wave representing said binary NRZ wave;

transmitting said partial response binary wave over said channel and recovering said partial response binary wave at a receiving station;

establishing a center threshold for said recovered partial response binary wave; and developing binary ones and zeros for the portions of said recovered partial response binary wave on opposite sides of said center threshold.

2. The method according to claim 1 in which said filtering of said binary NRZ wave is performed with a linear phase-frequency characteristic and an amplitude response function of $$A(f)=\frac{\pi f}{2f_1}\cot\frac{\pi f}{2f_1} \qquad 0 \le f \le f_1$$

$$A(f)=0 \qquad f>f_1.$$

3. A facsimile transceiver for use with voice telephone circuits comprising:

a scanner-printer unit operable to scan in synchronism with a remote similar unit;

optical means in said unit operable for analyzing a document at a predetermined rate and resolution to produce a scan line signal corresponding to a maximum transition rate of approximately 4,000 transitions per second;

quantizing means responsive to said scan line signal for producing a binary non-return to zero (NRZ) wave having transitions at the black-white transitions of the scan line on said document;

filter means responsive to said binary NRZ wave with an amplitude response $$A(f)=\frac{\pi f}{2f_1}\cot\frac{\pi f}{2f_1} \qquad 0 \le f \le f_1$$

$$A(f)=0 \qquad f>f_1.$$

where $f_1$ is approximately 2.17 kc and a linear phase-frequency characteristic for producing a partial response binary wave;

a stable oscillator;

means for deriving a carrier wave from said oscillator of frequency approximately 2.4 kc;

means for baseband balanced amplitude modulating said carrier wave with said partial response binary wave to produce a modulated carrier wave;

means operable for coupling said modulated carrier wave to a telephone line;

means operable for coupling a modulated carrier wave from a telephone line connection with said remote similar unit;

amplifier and transversal filter means responsive to the signal coupled from said telephone line for equalizing and correcting system and phone line distortion in the signal received from said remote unit;

envelope detector means responsive to the signal from said amplifier and transversal filter means for detecting said partial responsive binary wave;

slicer means responsive to said partial response binary wave with threshold detection centered on said partial binary response wave for obtaining a replica of said binary NRZ wave; and means for applying said replica of said binary NRZ wave to said scanner-printer unit to print a facsimile copy of the document scanned at said remote similar unit.

4. A transceiver according to claim 3 and including:

means responsive to the initiation of transmission from a document for sending for a limited interval a signal modulated at a level representing the mid-amplitude of said quantizer output; and means responsive to the initial reception of a modulated carrier for adjusting during said interval the slicing threshold of said slicing means to correspond to the level of said modulation.

5. Apparatus according to claim 4 in which the slicing threshold adjusting means comprises:

a gain control for said amplifier and transversal filter means;

a degenerative feedback control circuit responsive to the output of said slicer for adjusting said gain control; and means for maintaining the adjusted level for said gain control after said interval.

6. A modem for transmitting data over voice telephone circuits comprising:

means for deriving said data as a binary non-return to zero (NRZ) wave having a maximum transition rate of approximately 4,000 transitions per second;

filter means responsive to said binary NRZ wave having a linear phase frequency characteristic and an amplitude response $$A(f)=\frac{\pi f}{2f_1}\cot\frac{\pi f}{2f_1} \qquad 0 \le f \le f_1$$

$$A(f)=0 \qquad f_1<f$$

where $f_1$ is approximately 2.17 kc for producing a partial response binary wave;

means for supplying said partial response binary wave to a transmission terminal for transmission over said telephone circuits;

means for receiving said partial response binary wave from a telephone circuit; and slicer means responsive to said partial response binary wave with threshold detection centered on said partial response binary wave for obtaining a replica of said binary NRZ wave.

7. A modulation circuit for transmitting data over voice telephone circuits comprising:

means for deriving said data as a binary non-return to zero (NRZ) wave having a maximum transition rate of approximately 4,000 transitions per second; filter means responsive to said binary NRZ wave having a linear phase frequency characteristic and an amplitude response $$A(f)=\frac{\pi f}{2f_1}\cot\frac{\pi f}{2f_1} \qquad 0\leq f\leq f_1$$

$$A(f)=0 \qquad f_1<f$$

where $f_1$ is approximately 2.17 kc for producing a partial response binary wave; and means for supplying said partial response binary wave to a transmission terminal for transmission over said telephone circuits.

8. In a binary facsimile system having sending and receiving equipment for respectively scanning a document and reproducing a replica of the image pattern on the document wherein the scan signal is derived in the form of a binary signal representing the black and white image areas on said document, the binary signal being applied to modulate a carrier wave for transmission to said receiving equipment where the modulated carrier wave is demodulated to recover a binary signal which is used to produce said replica, the improvement comprising:

means for generating a modulation signal at the transmitting equipment having a value for a modulation characteristic intermediate the values of said characteristic representing black and white on said document;

means operative for a brief interval prior to each facsimile transmission for modulating said carrier wave with the intermediate value of said modulation signal;

means for processing the demodulated signal in said receiving equipment for evaluating said characteristic of the modulation signal relative to a predetermined threshold value used to recover a binary replica of said binary signal; and means responsive to the relative evaluation of said modulation signal and said threshold value during said brief interval for setting the gain of said receiving equipment at a level which makes modulation levels different than said intermediate value fall unambiguously either above or below said threshold.

9. Apparatus according to claim 8 in which said modulation characteristic is the amplitude of said modulation signal and said carrier wave is amplitude modulated and in which the intermediate value of said modulation signal is a modulation amplitude approximately half way between the peak values of the modulation amplitude produced by said binary signal.

10. Means for transmitting and receiving data over a band limited channel having zero response above a frequency $f_1$ comprising:

means for applying said data to said channel as a binary non-return to zero (NRZ) wave having a maximum transition rate of $Kf_1$ transitions per second where K approaches the value 2;

means for shaping the response of said channel such that the effective transmittance function has a linear phase-frequency characteristic, and an amplitude response $$A(f)=\frac{\pi f}{2f_1}\cot\frac{\pi f}{2f_1} \qquad 0\leq f\leq f_1$$

$$A(f)=0 \qquad f_1<f$$

to produce a partial response binary wave; and means for detecting said partial response binary wave to recover said data.

11. Means for transmitting data over a band limited channel having zero response above a frequency $f_1$ comprising:

means for applying said data to said channel as a binary non-return to zero (NRZ) wave having a maximum transition rate of $Kf_1$ transitions per second where K approaches the value 2; and means for shaping the response of said channel such that the effective transmittance function has a linear phase-frequency characteristic, and an amplitude response $$A(f)=\frac{\pi f}{2f_1}\cot\frac{\pi f}{2f_1} \qquad 0\leq f\leq f_1$$

$$A(f)=0 \qquad f_1<f_1.$$

12. Means for transmitting and receiving data over a band limited channel having zero response above a frequency $f_1$ comprising:

means for applying said data to said channel as a binary non-return to zero (NRZ) wave having a maximum transition rate of $Kf_1$ transitions per second where K approaches the value 2;

means for shaping the response of said channel such that the effective transmittance function has a linear phase-frequency characteristic, a smooth amplitude roll off which at frequency $Kf_1/2$ is less than 40 percent of mid-band response, and which completes its response to each transition with negligible overshoot in no longer time than $2/Kf_1$ to obtain a partial response binary wave representing said binary NRZ wave; and means for detecting said partial response binary wave to recover said data.

13. Means according to claim 12 in which said means for shaping the response of said channel comprises a filter having said transmittance function at the transmitting terminal.

14. Means for transmitting data over a band limited channel having zero response above a frequency $f_1$ comprising:

means for applying said data to said channel as a binary non-return to zero (NRZ) wave having a maximum transition rate of $Kf_1$ transitions per second where K approaches the value 2; and means for shaping the response of said channel such that the effective transmittance function has a linear phase-frequency characteristic, a smooth amplitude roll off which at frequency $Kf_1/2$ is less than 40 percent of mid-band response, and which completes its response to each transition with negligible overshoot in no longer time than $2/Kf_1$ to obtain a partial response binary wave representing said binary NRZ wave.

15. Means according to claim 14 in which said means for shaping the response of said channel comprises a filter having said transmittance function at the transmitting terminal.

* * * * *